July 3, 1928.
F. H. KELLIHER
1,675,497
PROCESS FOR PRODUCING CARBON DIOXIDE GAS
Filed June 19, 1926
4 Sheets-Sheet 1
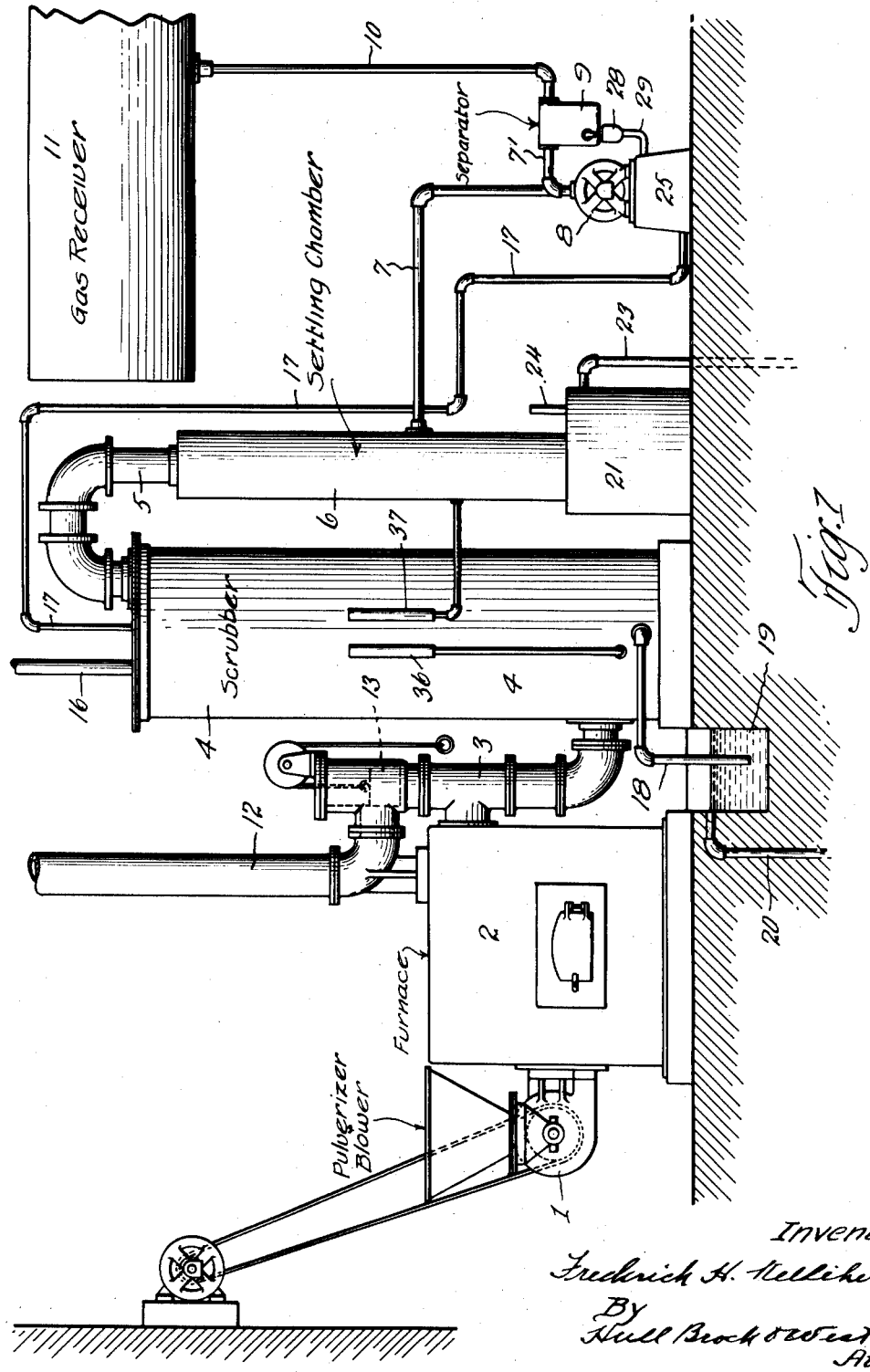
Inventor
Frederick H. Kelliher
By
Hull Broch & West
Attys.

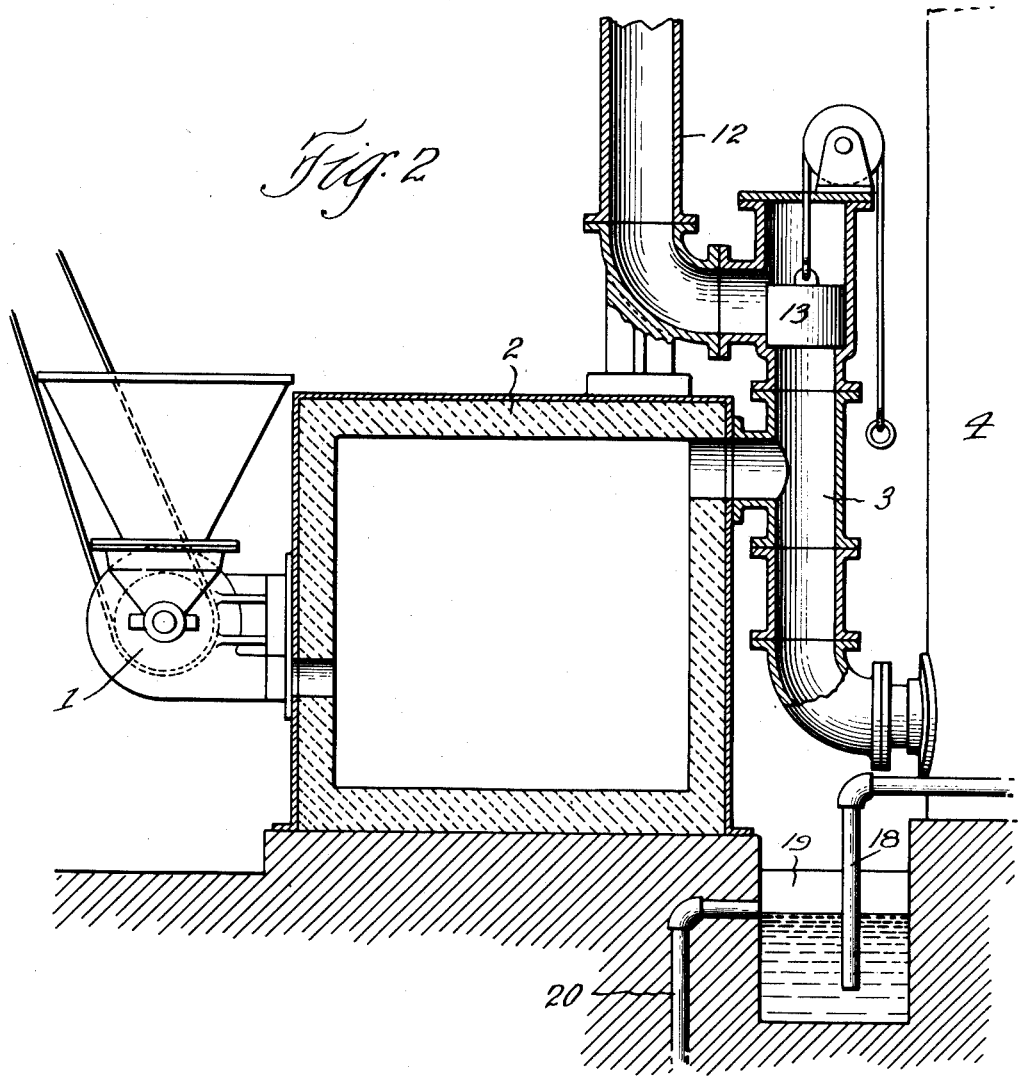
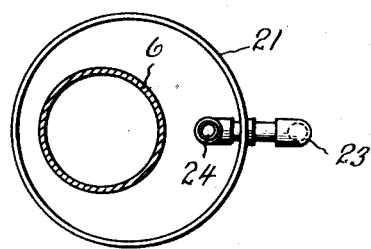

July 3, 1928.
F. H. KELLIHER
1,675,497
PROCESS FOR PRODUCING CARBON DIOXIDE GAS
Filed June 19, 1926     4 Sheets-Sheet 3
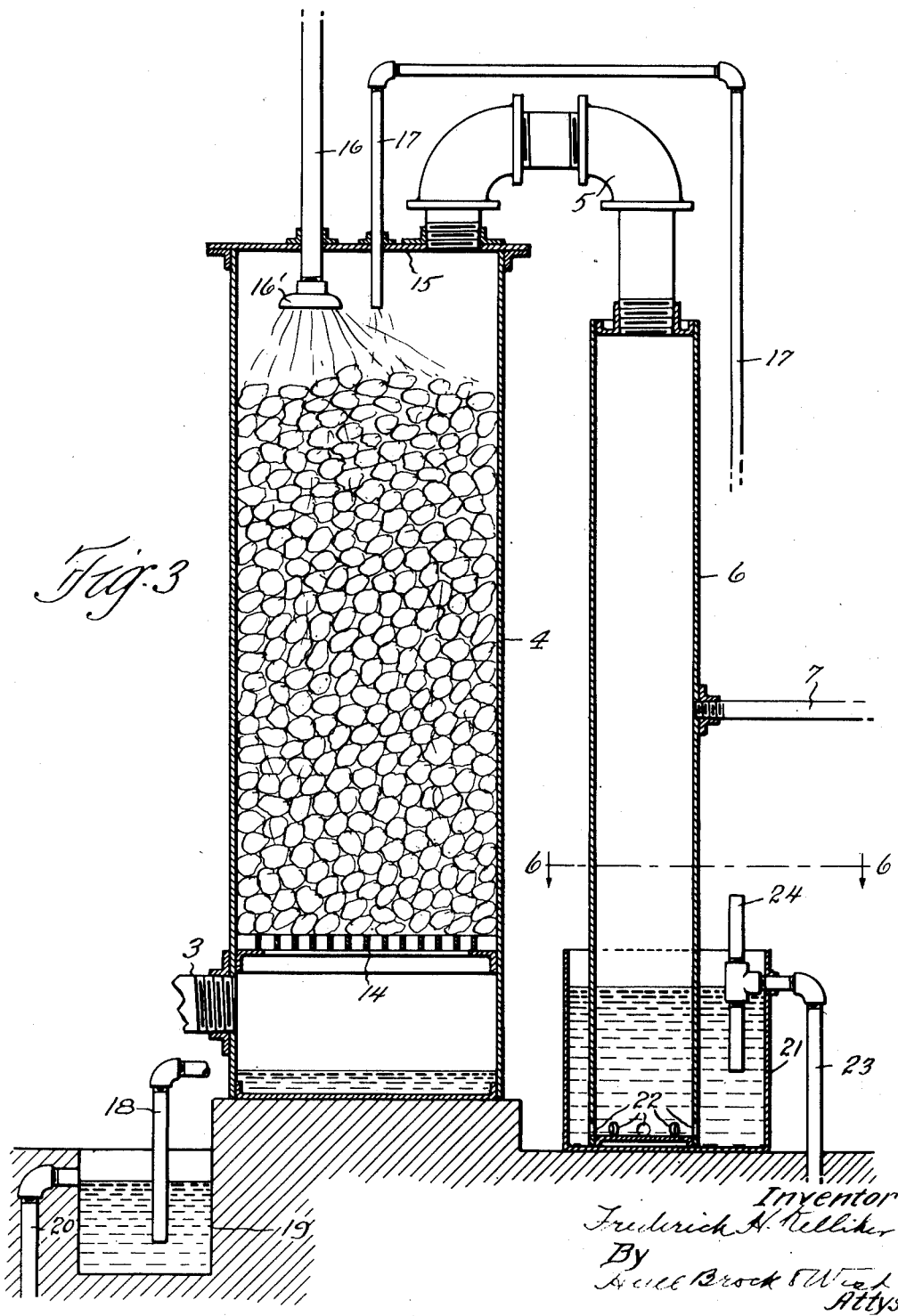

Inventor
Frederick H. Kelliher
By
Hull Brock & West
Attys.

Patented July 3, 1928.

UNITED STATES PATENT OFFICE.

1,675,497

FREDERICK H. KELLIHER, OF CLEVELAND, OHIO.

PROCESS FOR PRODUCING CARBON-DIOXIDE GAS.

Application filed June 19, 1926. Serial No. 117,032.

This invention relates to a method of producing carbon dioxide gas.

The main object of the invention is to provide a method of producing carbon dioxide gas which will be free from phenol and which will be well adapted for use in treating water for purifying the same.

Another object of the invention is to provide a method of producing carbon dioxide gas in which pulverized coal is burned in a closed furnace and the products of combustion are passed through an apparatus which will wash the carbon dioxide gas.

Another object of the invention is to provide a process of the class described which will obtain the maximum amount of carbon dioxide from a given quantity of fuel.

Figure 4:
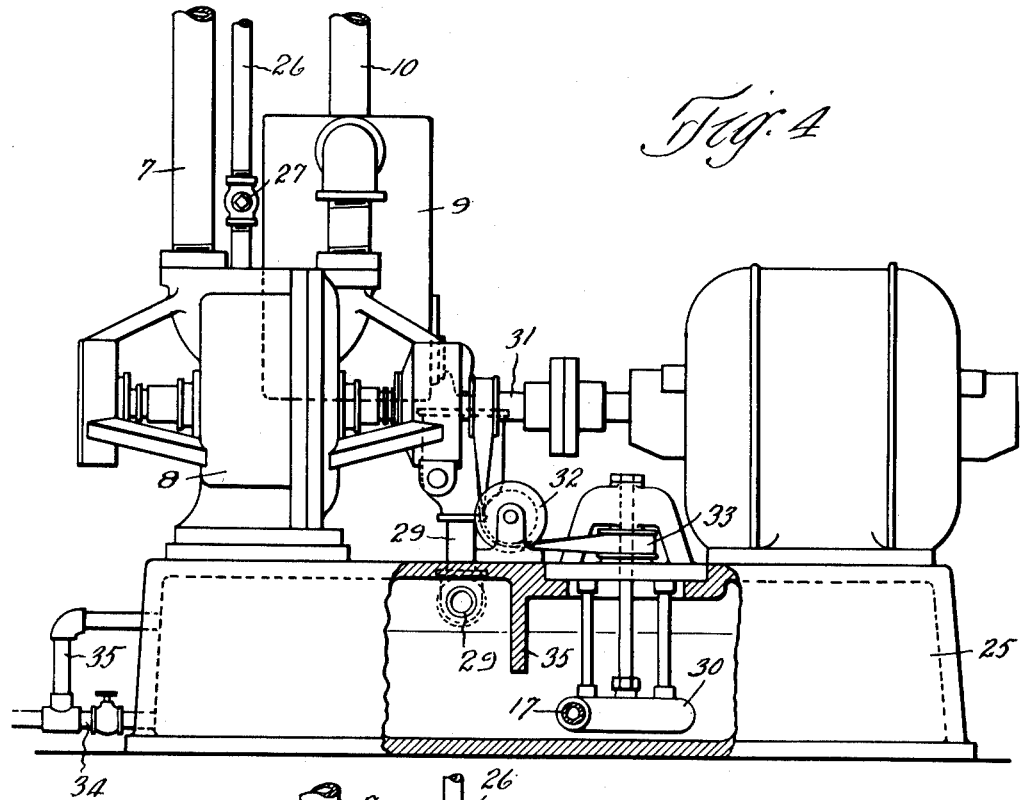
Figure 5:
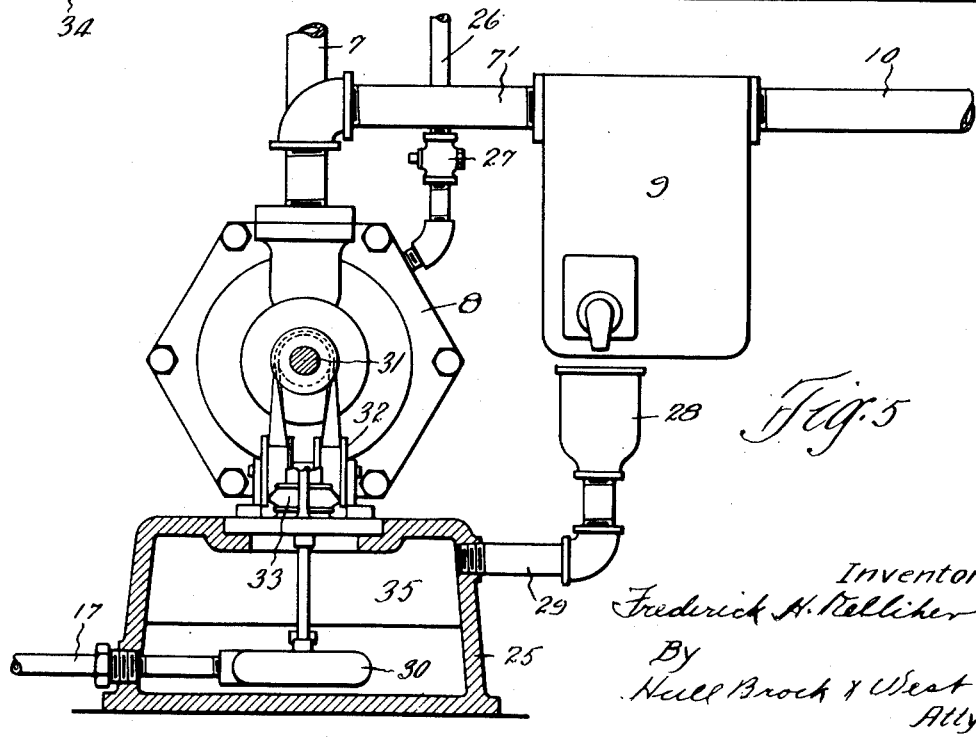

Further and more limited objects of my invention will appear as the description proceeds and by reference to the accompanying drawing in which Fig. 1 is a view in side elevation showing the general arrangement of my apparatus; Fig. 2 is an enlarged detail view partly in section and partly in side elevation showing the furnace and means for delivering the fuel to the same together with the connections leading to the scrubber; Fig. 3 is a vertical sectional view through the scrubber and dryer; Fig. 4 is a view in side elevation of the pump and its associated parts with parts cut away; Fig. 5 is a view in end elevation of the pump and separator; and Fig. 6 is a horizontal section on the line 6—6 of Fig. 3.

Referring now to the drawing my apparatus consists of a combined pulverizer and blower 1 feeding into a furnace 2 which is connected by a pipe 3 with the lower end of a scrubber 4, the upper end of which is connected by a pipe 5 with a settling chamber 6 which is connected by a pipe 7 with a pump 8 which discharges through a separator 9 and pipe 10 to a gas receiving tank 11.

Crushed coal is fed into the hopper of the combined pulverizer and blower where it is finely ground and blown into the furnace 2, the rate of feed being regulated by any suitable means. The blower furnishes sufficient air to the furnace so that there is practically complete combustion in the furnace. Connected with the pipe 3 is a purge pipe 12 having a valve 13 therein which may be opened to allow the products of combustion to escape to the open air when the furnace is first started.

Secured in the scrubber 4 near the bottom thereof is a grate 14 adapted to support the coke sponge. The scrubber is filled with coke up to a point near the top thereof as shown. A removable cover 15 closes the top of the scrubber and extending therethrough is a pipe 16 provided with a spray nozzle 16' and a pipe 17, the purpose of which will hereinafter appear. Connected with the lower end of the scrubber is a pipe 18 leading to a trap 19 having an overflow pipe 20 whereby to form a water seal for the pipe 18.

The upper end of scrubber 4 is connected with the settling chamber 6 by the pipe 5 as shown. The settling chamber is preferably a cylindrical tank of substantially the same height as the scrubber. The lower end of the settling chamber is positioned eccentrically in a receptacle 21, as shown most clearly in Fig. 6, and is provided with a plurality of openings 22. Extending through the wall of the receptacle 21 is a pipe 23 having a T 24 connected therewith and serves as an overflow for the receptacle 21. The T 24 prevents any siphon action through pipe 23. The receptacle is normally filled with liquid up to the level of the overflow pipe 23. Should the system become clogged between the settling-chamber and the furnace air will be drawn in through ports 22 and the operator will be warned that the system is not working properly.

The pump 8 is of the type disclosed in the patent to Nash No. 1,091,529 and is mounted on a hollow base 25. The intake side of the pump connects with the pipe 7 and the outlet side of the pump connects with a pipe 7' leading to the separator 9. Connected with the pump is a water delivery pipe 26 having a regulating valve 27 therein for controlling the supply of water to the pump. Additional water must be supplied to the pump as some of the water is taken off with the gas and is separated from the gas in the separator 9 and pipe 10 and is returned to the base of the pump through the cup 28 and pipe 29. Positioned within the base of the pump is a comparatively small centrifugal pump 30 having the discharge side thereof connected with the pipe 17. This pump is driven from the main shaft 31 by a belt and suitable pulleys 32 and 33 and serves to deliver the liquid from the base of the pump to the top of the scrubber which water contains a large quantity of $CO_2$ gas. This water on being returned to the scrubber meets with hot products of combustion and the carbon dioxide is driven off. This returning of the water from the pump to the scrubber materially increases the efficiency of the apparatus as this water is very rich in $CO_2$ which would otherwise be wasted. The hollow pump base 25 is provided with a drain pipe 34 and an overflow pipe 35 and any scum which might float on the water in the chamber 25 will flow off through the overflow pipe and not pass through the pump 30 and the pump base may be drained when desired through the pipe 35. The pump base is also provided with a dividing wall or partition 35' positioned between the inlet pipe 29 and the pump 30 which extends downwardly as shown in Fig. 4, the purpose of which is to serve as additional means for preventing impurities from reaching the pump 30.

The pump 8 is of the exhauster compressor type shown in Patent 1,091,529 in which a liquid piston maintains its form under the action of centrifugal force in such a manner as to act more like a solid piston and by this means it can exert a strong pressure and at the same time it retains its fluidity. This pump is well adapted for use as a vacuum pump in connection with high speed machinery. Another important feature of this pump is that it requires no lubrication and is water cooled and lubricated and is well adapted for use in my process. If an oil lubricated pump were used in my process the oil would volatilize and mix with the gas and produce phenol in the presence of water containing chlorine. The pump 8 is designed to deliver the entire products of combustion from the furnace to the scrubber and to deliver the products against a pressure of approximately eight pounds per square inch and the suction should be such that it will maintain a slight vacuum from 1 to 2 inches by water gage, as desired, irrespective of the fuel feed at any time. A suitable regulator device may be provided if necessary to control this suction.

Connected with the scrubber and settling chamber respectively are a pair of manometers 36 and 37 for indicating the conditions in each and suitable instruments may be provided for indicating the amount and quality of $CO_2$ obtained.

The operation of the device is as follows: Crushed coal is fed into the combined pulverizer and blower 1 where it is reduced to a finely divided condition and blown into the furnace 2 where it is burned to substantially complete combustion, the blower furnishing sufficient air to insure complete combustion. When the furnace is first started the purge valve 13 is opened to allow the products of combustion to pass out through the pipe 12 until the furnace has started. The purge valve is then closed and the products of combustion are withdrawn from the furnace by the pump 8 through pipe 3 into the bottom of the scrubber 4. The scrubber 4 is practically filled with coke as shown in Fig. 3 and the gases entering the bottom of the scrubber are very hot. The water entering through the spray nozzle 15 sprays down over the coke bed and cools and washes the gases. Due to the fact that the scrubber is immediately adjacent the furnace, the hot gases escape into the scrubber and the lower portion of the coke bed therein is kept at very high temperature as is also the water in the bottom of the scrubber and carbon dioxide which may have been absorbed by the cool water entering the top of the scrubber is driven off at the bottom of the scrubber and the water escaping through the pipe 18 will contain practically no carbon dioxide. Of course the products of combustion will contain a large amount of nitrogen as well as minor portions of other gases. The sulphur dioxide ($SO_2$) and sulphur trioxide ($SO_2$) which may be present in the products of combustion will be absorbed by the water in the scrubber forming sulphurous and sulphuric acid respectively. The water entering through plate 16 is water which has been treated with lime and filtered and the hot gases in the water will be cooled and washed. The gases are withdrawn from the scrubber through the pipe 5 into the settling chamber 6. The drier 6 functions by condensation of the moisture in the gas. Any minute particles of amorphous carbon or other impurities that may be drawn over into the settling chamber fall to the bottom of the settling chamber. The gases are withdrawn from the settling chamber through the pipe 7 and through the pump 8 into the separator 9 and pipe 10 and delivered to the gas receiver 11. As the pump 8 is of the liquid piston type, considerable water passes over into the separator 9 and is there separated from the gas and delivered into the cup 28 and pipe 29 to the base of the pump. The water which passes into the base of the pump is delivered by the centrifugal pump 30 through pipe 17 to the top of the scrubber. This water is rich in carbon dioxide and on being returned to the scrubber meets with the hot products of combustion therein and the carbon dioxide is driven off. This returning of the water from the pump to the scrubber materially increases the efficiency of the apparatus as the $CO_2$ gas contained in the pump water will be driven off in the scrubber. The unabsorbed gases consist chiefly of carbon dioxide and nitrogen but there is no disadvantage in passing this gas through the water to be treated as the nitrogen will pass out through the water into the atmosphere or may be collected if desired. The carbon dioxide causes the hydrated lime contained in the water to be changed to calcium carbonate and causes a precipitation of the organic matter and forms a floc or curd which will settle leaving a perfectly clear supernatant solution. The gas obtained by my process is substantially 13 percent carbondioxide, the remaining portion being made up chiefly of nitrogen. The phenolic constituents contained in the fuel are completely consumed in the furnace.

It will now be clear that I have provided a process which will accomplish the objects of the invention as hereinbefore stated.

Having thus described my invention, what I claim is:—

1. The process of producing a gas containing carbon dioxide which consists in burning a finely divided carbonaceous material in a closed furnace in the presence of sufficient air to insure substantially complete combustion without producing carbon monoxide, operating a water piston suction pump to withdraw the products of combustion from the furnace through a scrubber and a settling chamber and to deliver the gas so obtained through a separator to a gas receiving tank, and returning to the upper part of the scrubber the water which is removed from the gas in the separator.

2. The process of producing a gas containing carbon dioxide which consists in feeding a finely divided carbonaceous fuel into a furnace, and burning the same therein in the presence of sufficient air to insure substantially complete combustion without producing carbon monoxide, withdrawing the products of combustion from the furnace by means of a liquid piston suction pump and passing the same through a scrubber and then through a settling chamber and returning to the upper end of the scrubber the excess liquid which passes through the pump along with the gas.

3. The process of producing a gas containing carbon dioxide which consists in burning finely divided coal in a closed furnace in the presence of sufficient air to support substantially complete combustion without producing carbon monoxide, withdrawing the products of combustion from the furnace by means of a suction pump of the liquid piston type and passing the same through a scrubber then through a settling chamber and finally through a separator for removing residual moisture and returning to the scrubber the moisture removed in the separator.

4. The process of producing a gas containing carbon dioxide which is substantially free from phenolic constituents, which consists in burning powdered coal in a closed furnace in the presence of sufficient air to support complete combustion to carbon dioxide without producing carbon monoxide, leading the gaseous products into the lower end of a scrubber and entraining the same against finely divided sprays of water continuously supplied to the scrubber, retaining the water in the scrubber until it becomes sufficiently heated by the products of combustion to drive off substantially all of the carbon dioxide absorbed thereby, and then withdrawing the gas and passing the same through a settling chamber and finally collecting the same in a suitable receiver.

5. The process of producing a gas containing carbon dioxide which is free from phenolic constituents which consists in burning a finely divided carbonaceous fuel in a furnace in the presence of sufficient air to support complete combustion to carbon dioxide without producing carbon monoxide, drawing the products of combustion through a scrubber in contact with continuously flowing water fed into the top portion of the scrubber, retaining the water in the scrubber until substantially all of the carbon dioxide absorbed thereby is driven off, withdrawing the gases so obtained and passing the same through a settling chamber for removing suspended particles of amorphous carbon and finally collecting the gas in a suitable receiver.

6. The process of producing a gas containing carbon dioxide which is free from phenolic constituents which consists in burning a finely divided carbonaceous fuel in a furnace in the presence of sufficient air for substantially complete combustion to carbon dioxide without producing carbon monoxide, withdrawing the products of combustion through a scrubber and entraining the same against finely divided sprays of water continuously supplied to the scrubber whereby to absorb the sulphuric acid gas which may be present in the products of combustion, retaining the water in the scrubber for the purpose of driving off the carbon dioxide which may have been absorbed thereby, withdrawing the unabsorbed gases and passing the same through a settling chamber and finally collecting the gas in a suitable receiver.

7. The process of producing a gas containing carbon dioxide which is free from phenolic compounds which consists in burning a finely divided carbonaceous fuel in a furnace in the presence of sufficient air to support complete combustion without producing carbon monoxide, leading the gaseous products directly into a scrubber and entraining the same against finely divided sprays of water continuously supplied to the scrubber for the purpose of absorbing the sulphuric acid gas contained in the gases, retaining the water within the scrubber until the same has become sufficiently heated to drive off the carbon dioxide which may have been absorbed thereby, withdrawing the residual gases from the scrubber and removing all particles of amorphous carbon which may remain suspended therein and finally collecting gas in a suitable receiver.

8. The process of producing a gas containing carbon dioxide which is substantially free from phenolic constituents which consists in reducing a carbonaceous fuel to a finely divided condition and feeding the same into a closed furnace by means of an air blower and burning the same therein, the blower furnishing sufficient air to insure substantially complete combustion without producing carbon monoxide, withdrawing the products of combustion from the furnace and passing the same into a scrubber, entraining the same against finely divided sprays of water continuously supplied to the scrubber, retaining the water in the scrubber until substantially all of the carbon dioxide absorbed thereby is driven off, withdrawing the gas so obtained and removing therefrom the suspended particles of amorphous carbon and finally collecting the gas in a suitable receiver.

9. The process of producing a gas containing carbon dioxide which consists in feeding powdered coal into a closed furnace by means of an air blower and burning the same therein, the blower furnishing sufficient air to insure substantially complete combustion to carbon dioxide without producing carbon monoxide, passing the products of combustion into a scrubber and entraining the same against finely divided sprays of water continuously supplied to the scrubber, retaining the water in the scrubber until the same becomes sufficiently heated to drive off substantially all of the carbon dioxide absorbed thereby, withdrawing the gases from the scrubber by means of a suction pump of the water piston type and returning to the scrubber the excess water which passes through the pump and finally collecting the gas in a suitable receiver.

10. The steps in the process of producing a gas containing carbon dioxide which is substantially free from phenolic constituents which consist in feeding powdered coal into a closed furnace by means of an air blower and burning the same therein, the blower furnishing sufficient air to insure substantially complete combustion without producing carbon monoxide, using a suction pump of the liquid piston type for withdrawing the products of combustion from the furnace and for passing the same through a scrubber and then through a settling chamber and returning to the scrubber the excess liquid which passes through the pump.

In testimony whereof, I hereunto affix my signature.

FREDERICK H. KELLIHER.